United States Patent [19]
Andrews et al.

[11] Patent Number: 5,305,320
[45] Date of Patent: Apr. 19, 1994

[54] PERIPHERAL COMMUNICATIONS NETWORK

[75] Inventors: Michael W. Andrews, Maplewood; Stephen J. Brolin, Livingston; Robert W. DeMarco, Hanover Township, Morris County; Daniel S. Greenberg; David J. Hodgdon, both of Parsippany-Troy Hills Township, Morris County; Chandan Sarkar, Wharton; Gordon D. Woods, RandolphI Township, Morris County, all of N.J.

[73] Assignee: AT&T Bell Laboratories, Murray Hill, N.J.

[21] Appl. No.: 953,571

[22] Filed: Oct. 6, 1992

[51] Int. Cl.⁵ ............................ H04L 29/08
[52] U.S. Cl. .................. 370/85.15; 370/94.3; 370/110.1
[58] Field of Search ............. 370/85.1, 85.2, 85.6, 370/85.8, 94.3, 110.1, 100.1, 111, 119, 85.3, 85.7, 85.15; 375/7, 8, 121

[56] References Cited

U.S. PATENT DOCUMENTS

| | | | |
|---|---|---|---|
| 4,347,498 | 8/1982 | Lee et al. | 340/825.02 |
| 4,689,786 | 8/1987 | Sidhu et al. | 370/94.1 |
| 4,701,756 | 10/1987 | Burr | 340/825.02 |
| 5,040,176 | 8/1991 | Barzilai et al. | 370/110.1 |
| 5,105,422 | 4/1992 | Noll et al. | 370/110.1 |
| 5,175,730 | 12/1992 | Murai | 370/85.2 |
| 5,177,739 | 1/1993 | Basnuevo et al. | 370/108 |
| 5,202,884 | 4/1993 | Close et al. | 375/121 |
| 5,210,750 | 5/1993 | Nassehi et al. | 370/85.2 |

OTHER PUBLICATIONS

R. M. Metcalfe et al., "Ethernet: Distributed Packet Switching for Local Computer Networks," *Communications of the ACM*, vol. 19, No. 7 (Jul. 1976), pp. 395-404.

N. Abramson, "The Throughput of Packet Broadcasting Channels," *IEEE Transactions on Communications*, vol. COM-25, No. 1 (Jan. 1977), pp. 117-128.

*Primary Examiner*—Benedict V. Safourek
*Attorney, Agent, or Firm*—Lester H. Birnbaum

[57] ABSTRACT

Disclosed is a communications network for peripherals in a digital loop carrier transmission system. A broadcast STAR network is employed so that all peripherals receive any message which is broadcast by any of the peripherals. No peripheral broadcasts without clearance from the active communications hub. Two hubs can be provided to alternatively act as the active hub. Each peripheral includes a controller which transmits a request to send signal, multiplexes the request to send signal with an outgoing message, receives clear to send signals, and demultiplexes the clear to send signals from an incoming message.

10 Claims, 4 Drawing Sheets

5,305,320

PERIPHERAL COMMUNICATIONS NETWORK

BACKGROUND OF THE INVENTION

This invention relates to digital loop carrier transmission systems and, in particular, to communication among common equipment peripherals within a remote and/or distant terminal.

In digital loop carrier transmission systems, peripherals within a remote or distant terminal are designated in terms of their function, and each may comprise a single circuit pack, a portion of a circuit pack, or several circuit packs within an equipment shelf or in different equipment shelves. For example, in the Subscriber Loop Carrier (SLC ®) 2000 System, a metallic distribution controller (MDC) is located within a remote terminal and combines the functions of a transmit-receive unit (TRU) and a bank controller unit (BCU) in order to multiplex/demultiplex data and to control the other components of the remote terminal. Other peripherals which are part of the common equipment of the remote terminal include the system timing unit (STU) which handles the timing of the system, the virtual tributary unit (VTU) which acts as an interface to the optical portion of the network, and the provisioning and display control unit (PDC) which drives the display panel. These peripherals must be able to communicate with each other for the system to operate.

Typical communications systems for local area networks utilize a STAR configuration where each peripheral is coupled to a hub which controls transmission between the peripherals. Each peripheral could have a dedicated slot in which to send its messages, and these messages would be broadcast to all the peripherals (see, e.g., N. Abramson, "The Throughput of Packet Broadcasting Channels," *IEEE Transactions on Communications*, Vol. COM-25, No. 1 (Jan. 77), pp. 117–128). Such an approach was inefficient for a SLC ® carrier system since a single central processing unit (CPU) at each peripheral would have to continually monitor incoming messages to see which messages were meant for that peripheral. Further, in many prior art STAR systems, it was necessary to detect collisions among messages from different peripherals and retransmit any messages that collided (see, e.g. R. M. Metcalfe et al., "Ethernet: Distributed Packet Switching for Local Computer Networks," *Communications of the ACM*, Vol. 19, No. 7 (July 1976), pp. 395–404 and U.S. Pat. No. 4,347,498 issued to Lee et al.). This requirement made the system unduly complex.

Other STAR network proposals have included the use of an alternate hub to take over communications in the event of a failure in the main hub (see, e.g., U.S. Pat. No. 4,701,756 issued to Burr).

SUMMARY OF THE INVENTION

The invention, in accordance with one aspect, is a circuit in a peripheral for use in a digital loop carrier transmission system employing a broadcast STAR network for communication among peripherals of the system. The circuit comprises a microprocessor including a peripheral controller. The peripheral controller includes means for generating a signal indicating a request to send a message to a hub of the system, and means for processing a signal indicating it is clear to send said message to the hub. Said controller further includes means for generating an outgoing data message stream, and means for processing an incoming data message stream in order to determine if said incoming message stream is intended for the peripheral including the circuit. The circuit further includes means for multiplexing the request to send signal with the outgoing data message stream, and means for demultiplexing the clear to send signal from the incoming data message stream.

BRIEF DESCRIPTION OF THE DRAWING

These and other features of the invention are delineated in detail in the following description. In the drawing.

DETAILED DESCRIPTION

In a typical digital loop carrier transmission system, such as the SLC ® system, digital signals are transmitted bidirectionally between a local digital switch, 10, and a remote terminal, 11, over a link, 12. The remote terminal includes a plurality of channel units, e.g., 13, which provide the interface between the network and the subscribers. In the SLC ® 2000 system, four subscriber lines may be coupled to each channel unit. The remote terminal also includes equipment, illustrated by block 14, which is common to a group of subscribers. It is the communications within this common equipment which is the primary thrust of this application.

Figure 1:
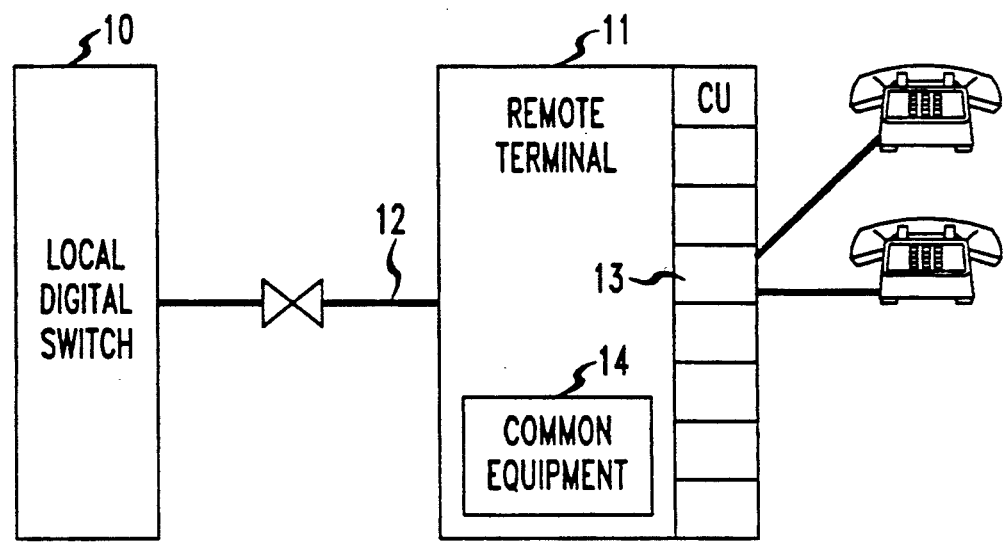
FIG. 1 is a block diagram of a basic digital loop carrier transmission system which can utilize the present invention.
Figure 2:
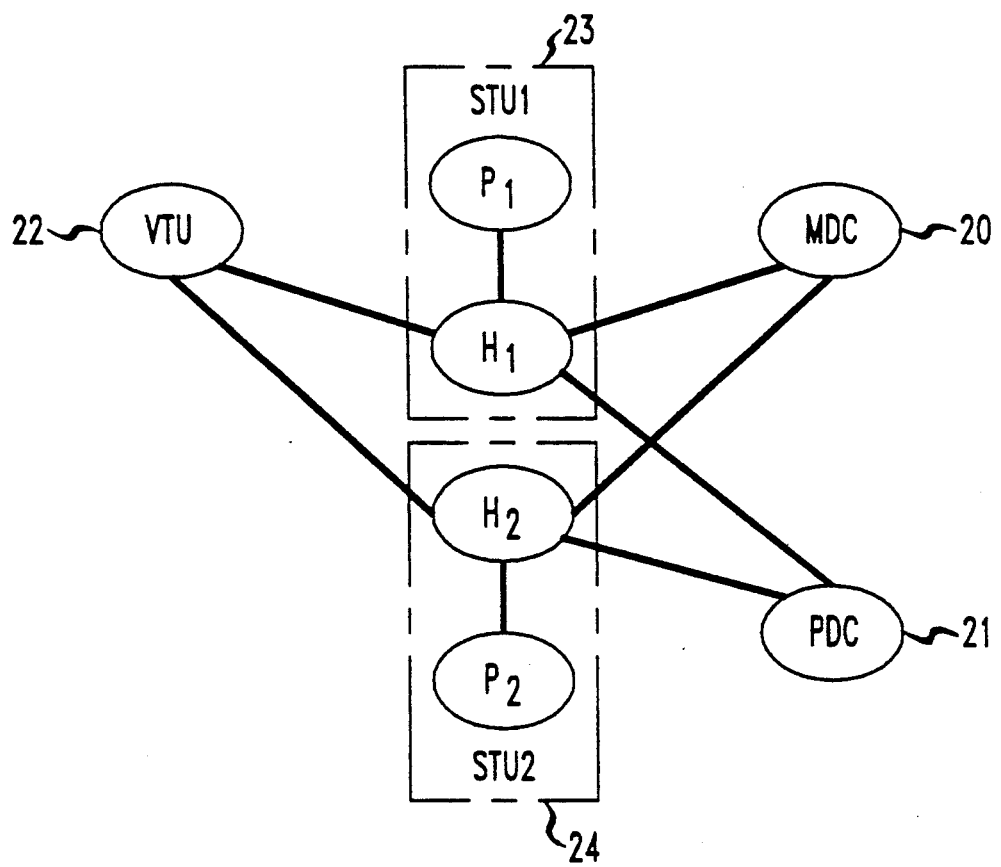
FIG. 2 is a block diagram illustrating a broadcast STAR network for communication among peripherals in accordance with an embodiment of the invention.

FIG. 2 illustrates a communications network comprising the peripherals of the common equipment in accordance with a particular example. In this example, the peripherals include a metallic distribution controller (MDC), 20, a provisioning and display control unit (PDC), 21, a virtual tributary unit (VTU), 22, and two system timing units (STU1 and STU2), 23 and 24. The STUs, 23 and 24, are chosen to alternatively act as the hub and, consequently, include circuitry, illustrated as $H_1$ and $H_2$, which will control the transmission of messages among the other peripherals. The STUs also include peripheral circuitry themselves, represented by $P_1$ and $P_2$, which will communicate with the hubs.

The hubs, $H_1$ and $H_2$, will alternatively act as the controller of the messages. Each peripheral, 20, 21 and 22, acts as a node which is coupled to both hubs, $H_1$ and $H_2$, in a STAR configuration. In this embodiment, each node, $P_1$ and $P_2$, is coupled only to a single hub. However, each node, $P_1$ and $P_2$, could be connected to both hubs if desired. Each peripheral will broadcast its message to all other peripherals through the active hub, but only after clearance is given by the hub to that peripheral in a manner to be described. Thus, collision detection is not required. Each peripheral, upon receiving a message from the broadcasting peripheral, will determine if the message is intended for it according to the address of the message stream. If the message is not intended for that peripheral, it will merely ignore the message.

A distributed hub ($H_1$ and $H_2$) arrangement is chosen so that while one hub is active, the inactive hub can be tested through communication with its peripheral ($P_1$ or $P_2$). Thus, it is desirable to transfer active status between the hubs at regular intervals. It will be noted that each peripheral (other than $P_1$ and $P_2$) is connected to both hubs. However, the peripherals will be instructed to listen to only the active hub. This can be done, for example, by use of a separate physical wire between hubs and peripherals to indicate active status, by inserting a bit in the message stream, or by having each peripheral listen to one hub if it detects errors from the other hub.

Figure 3:
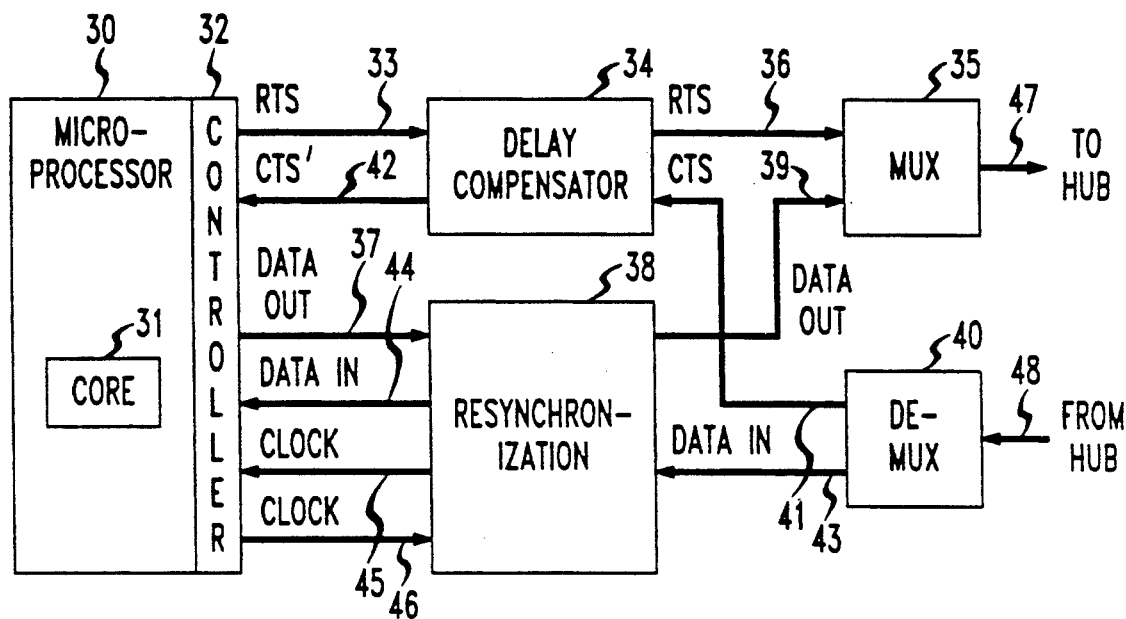
FIG. 3 is a block diagram of a circuit which is part of a peripheral in the STAR network in accordance with the same embodiment.

FIG. 3 illustrates a portion of the circuitry on each peripheral which is compatible with the communications network. A microprocessor, 30, is provided which includes a core central processing unit (CPU), 31, as well as a peripheral controller, 32, which is shown in more detail in FIG. 7. The microprocessor can be, for example, a Motorola 68302 processor which includes a 68000 CPU to serve as the core and a reduced instruction set computer (RISC) to serve as the peripheral controller. The controller will handle the data messages and control signals to and from the peripherals so that, for example, the core is not disturbed when a message appears from the hub which is not intended for that peripheral.

Request to send (RTS) control signals are generated by a flow control circuit (80 of FIG. 7) and coupled from the controller to a delay compensator circuit, 34, on line 33 and then to a multiplexer, 35, on line 36. The multiplexer, 35, is coupled to the hubs $H_1$, $H_2$ on line 47. DATA OUT messages are generated by an HDLC transceiver (81 of FIG. 7) and coupled from the controller, 32, on line 37 to a resynchronization circuit, 38, and then to the multiplexer, 35, on line 39.

A demultiplexer, 40, receives DATA IN messages and clear to send (CTS) signals from the hubs $H_1$, $H_2$ on line 48. The CTS signals from the active hub are coupled to the delay compensator circuit, 34, on line 41 and then CTS' signals are sent to the controller, 32, on line 42 where they are processed by the flow control circuit, 80 of FIG. 7. The DATA IN messages are coupled to the resynchronization circuit on line 43 and then to the controller, 32, on line 44 where they are processed by the HDLC transceiver, 81 of FIG. 7. Clock signals are also coupled between the resynchronization circuit 38 and controller, 32, on lines 45 and 46.

Figure 8:
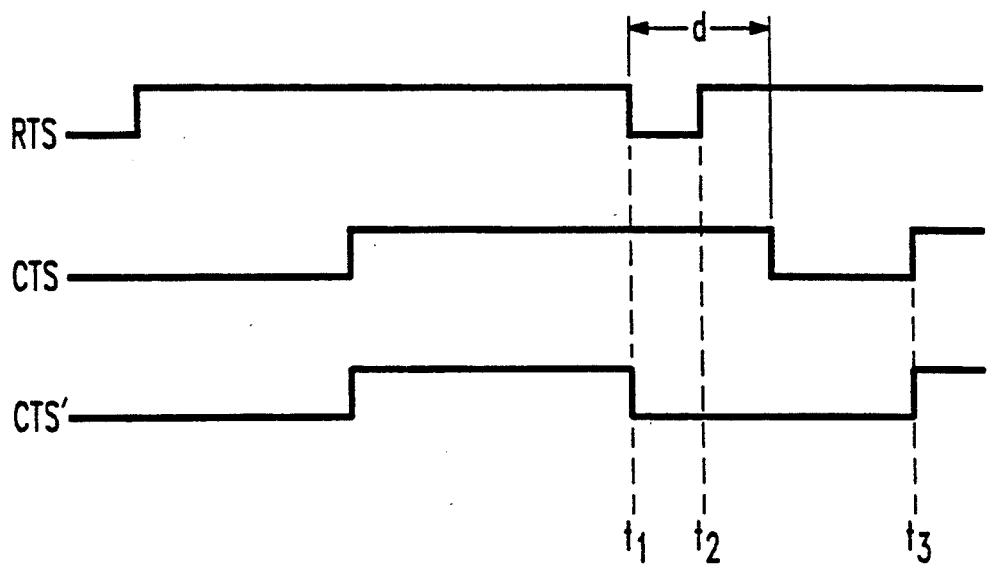
FIG. 8 is a waveform diagram useful in understanding features of the invention.

The operation of the circuit of FIG. 3 will now be described with further reference to FIGS. 4 and 5. When a peripheral wishes to send a message (DATA OUT) to any other peripheral it must first assert a request to send (RTS) to the hub $H_1$ or $H_2$ and wait for a clear to send (CTS) signal from the hub $H_1$ or $H_2$. The RTS signal is generated by the flow control portion, 80, of the controller, 32, and is coupled to the delay compensator circuit, 34, which functions to prevent the transmission of more than one message after a CTS signal is received to take into account the fact that there is a propagation delay between the transmission of RTS and the receipt of CTS by the peripheral, and the transmission of a second packet may not, in fact, be authorized by the hub. This function is accomplished as shown in FIG. 8 by removing CTS' from line 42 as soon as the RTS signal is removed (at time $t_1$). If the peripheral then wants to re-assert RTS (at time $t_2$) it must wait for another CTS signal ($t_3$) where CTS' will be reset. Thus, the delay "d" between removing RTS and CTS does not trigger a new message.

Figure 4:
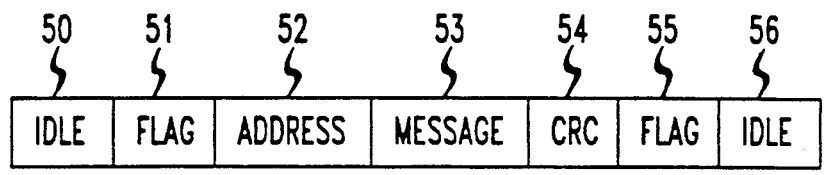
FIG. 4 is a block diagram of a typical message data stream from a peripheral in accordance with an embodiment of the invention.

The message output, DATA OUT, on line 37 is generated in the general form illustrated in FIG. 4 by the HDLC transceiver portion, 81, of the controller, 32, in combination with the memory 83, which includes the message and address, through a Direct Memory Access (DMA) 82. This stream conforms to the high-level data link control (HDLC) protocol. Prior to the time the peripheral receives the CTS signal, including the time that an RTS signal is asserted, the stream will be in the idle condition, represented by block 50. In this particular example, "idle" is a stream of digital "1"s. One of the advantages of using an all "1"s (or all "0"s) idle is that synchronization is maintained in the system when the transmitting peripheral is changed. Once CTS is received from the hub on line 41 and CTS' on line 42 is set, the controller begins transmitting the rest of the message stream. This stream includes at least one flag represented by block 51, the destination address for the message (block 52), the actual message portion (block 53), a cyclical redundancy check (CRC) portion (block 54), and another flag (block 55) to define the boundary of the message. The data stream then returns to the idle condition (block 56).

The message stream of FIG. 4 is coupled to the resynchronization circuit, 38, where any timing differences between the microprocessor, 30, and the hubs, $H_1$ or $H_2$, are corrected. For example, data is transmitted from a Motorola microprocessor in 4.1 mbits/sec and sent to the hub in 16.4 mbits/sec. Thus, a rate compression is desired in the transmit direction and a rate expansion is desired in the receive direction.

The resynchronized message stream (DATA OUT) is then coupled to multiplexer 35 on line 39 in order to combine the stream with the RTS signal, as well as all other data (not shown), which will be transmitted from the peripheral.

Figure 5:
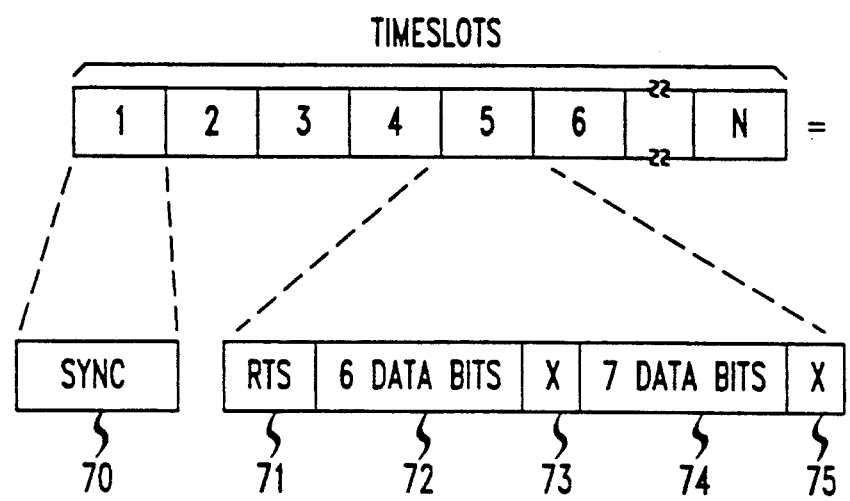
FIG. 5 is a block diagram of a typical multiplexed data stream transmitted by a peripheral in accordance with the same embodiment.

The data on line 47 takes the general form illustrated by FIG. 5. The data stream comprises "N" time slots of 16 bits each. In this example, N=128, but any number of time slots may be employed. The first time slot shown, 70, is a synchronization pattern. The bits from the message stream of this peripheral are combined with an RTS bit in one of the time slots, in this example, time slot number 5, which would normally be used for another synchronization signal. The RTS bit, 71, is followed by a block, 72, of 6 data bits from the message stream. As mentioned previously, these bits will be the all "1"s idle signal until a CTS bit is received from the hub. The following bit, represented by block 73, is a synchronization bit represented by "X". This bit is followed by another block of message bits, 74, which in this example includes 7 bits. Finally, block 75 includes another synchronization bit. In the reverse directions, the hub, $H_1$ or $H_2$ will send back data in the same form in one of the synchronization time slots, except that a CTS bit will replace the RTS bit. (The rest of the data in blocks 72 and 74 will be the same idle signal previously transmitted by the peripheral.) Advantageously, the other time slots (e.g., 2, 3, 4, and 6) can carry customer voice and data through the remote terminal.

Figure 7:
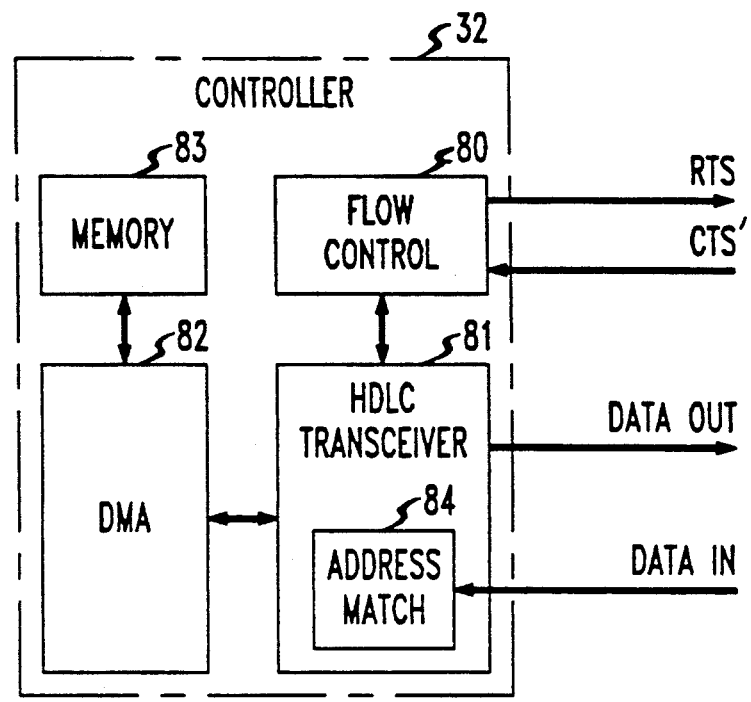
FIG. 7 is a more detailed block diagram of a portion of the circuit of FIG. 3.

Referring to FIG. 7, the HDLC transceiver, 81, includes an address match circuit 84. When DATA IN is received, the circuit will determine if the message is intended for that peripheral by inspecting the address and comparing it with its own address, stored in memory 83, which is accessed by a Direct Memory Access (DMA) 82. If the message is intended for the peripheral, it will be passed onto the core (31 of FIG. 3) for processing. Otherwise, it will be ignored.

Figure 6:
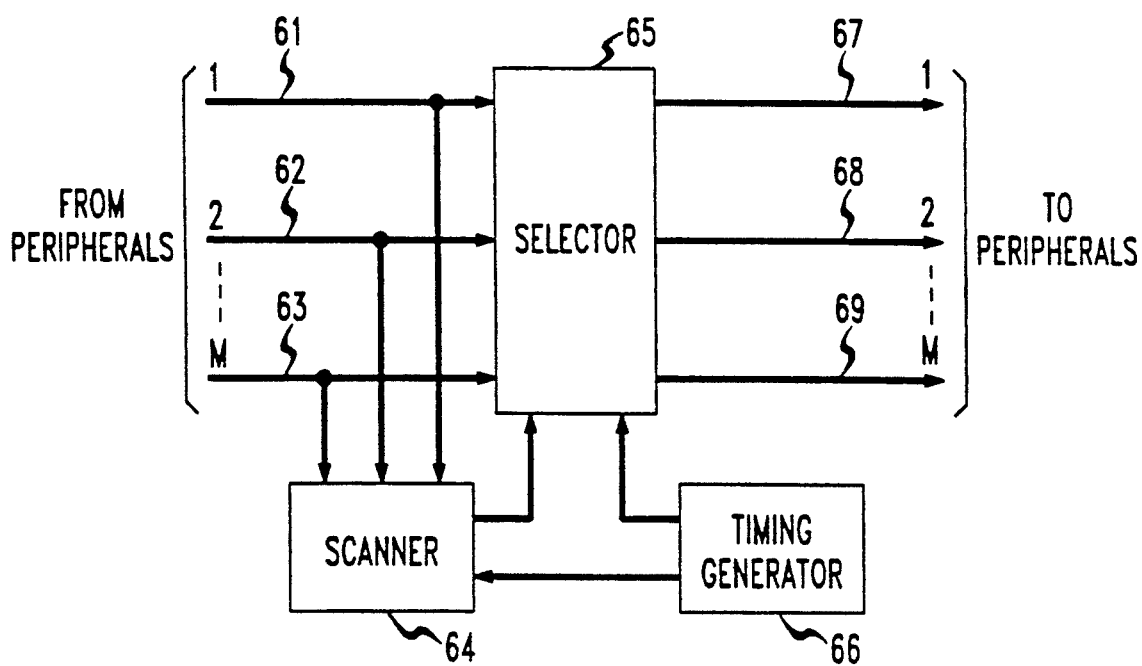
FIG. 6 is a block diagram of a portion of a hub in accordance with an embodiment of the invention.

FIG. 6 illustrates a portion of the circuitry of each hub, $H_1$ or $H_2$, which is useful in the communications network. Data from each peripheral (1,2→M) is received on separate lines (e.g., 61, 62 and 63, respectively). It will be recalled that the data stream includes a combination of control stream (RTS bit) and message stream from a particular peripheral. A scanner circuit, 64, monitors each incoming line for the presence of an RTS bit. Advantageously, the scanner will wait for two consecutive RTS bits from the peripheral as an error check before acting on the request. If the scanner detects RTS bits from more than one peripheral, the scanner will choose one peripheral according to a pre-determined priority scheme. For example, a "round robin" scheme could be implemented where the peripherals are chosen on a rotational basis according to the previous peripherals given permission to transmit.

A timing generator, 66 which acts as a counter, is coupled to the scanner 64 so that the scanner can identify which time slot includes the RTS bit. For example, there are typically 32 sync time slots, only four of which would include a message stream from a peripheral. Once the scanner selects the appropriate peripheral, a signal is sent to the selector circuit, 65, in order to indicate to the selector the identity of the selected peripheral. The selector circuit, 65, will generate a CTS signal and transmit it to the selected peripheral on one of lines 67, 68 or 69. At the same time, the selector will couple the message stream of the selected peripheral to all peripherals (1,2 . . . M) on lines 67, 68 and 69.

After a peripheral is selected, the scanner, 64, will continue to monitor that peripheral to determine when the RTS from that peripheral is withdrawn. Once an RTS no longer appears, the scanner will send a signal to the selector, 65, indicating that the peripheral is no longer selected. At that point, the selector disconnects the message stream of the previously-selected peripheral to the other peripherals, and also removes the CTS signal to the previously-selected peripheral. During the time that no peripheral is selected for transmission, the selector will send an idle signal (e.g., all "1"s to all peripherals.

Various modifications will become apparent to those skilled in the art. All such variations which basically rely on the teachings through which the invention has advanced the art are properly considered within the scope of the invention.

We claim:

1. A circuit in a peripheral component for use in a digital loop carrier transmission system employing a broadcast STAR network for communication among peripheral components of the system, the circuit comprising:

a microprocessor including a peripheral controller, the controller including means for transmitting an outgoing message stream to a hub, means for transmitting to the hub a signal indicating a request to send a message to other peripherals of the system, means for receiving a signal indicating it is clear to send said message, and means for processing an incoming message stream from the hub in order to determine if said incoming message stream is intended for the peripheral including the circuit;

means for multiplexing the request to send signal with the outgoing message stream; and means for demultiplexing the clear to send signal from an incoming message stream.

2. The circuit according to claim 1 further comprising a synchronization circuit coupled between said controller and said multiplexer and demultiplexer.

3. The circuit according to claim 1 further comprising a delay compensator circuit coupled between said controller and said multiplexer and demultiplexer, said circuit removing the clear to send signal to the controller as soon as the request to send signal is removed from the outgoing message stream.

4. The circuit according to claim 1 wherein the microprocessor further comprises a core central processing unit.

5. The circuit according to claim 1 wherein the means for transmitting a request to send signal and for receiving a clear to send signal comprise a flow control circuit.

6. The circuit according to claim 1 wherein the means for transmitting an outgoing message stream and for processing an incoming message stream comprises a high level data link control transceiver coupled to a memory through a direct memory access circuit.

7. The circuit according to claim 6 wherein the transceiver includes an address match circuit for determining if the incoming message is intended for the peripheral.

8. The circuit according to claim 1 wherein the means for multiplexing is capable of multiplexing the request to send signal and message stream into a synchronization time slot of the system.

9. A circuit for use in a digital loop carrier transmission system employing a broadcast STAR network for communication among peripheral components of the system, the circuit comprising means for receiving message streams from the peripherals;

means for scanning the message streams to determine the presence of a request to send signal;

means for selecting the message stream of a peripheral including a request to send signal for transmission to all peripherals of the system; and means for transmitting a clear to send signal to the selected peripheral.

10. The circuit according to claim 9 further comprising a timing generator coupled to said scanning means.

* * * * *